(12) United States Patent
Galbreath et al.

(10) Patent No.: US 7,585,030 B2
(45) Date of Patent: Sep. 8, 2009

(54) ENVIRONMENTALLY FRIENDLY LAYERED SEATING ASSEMBLY

(76) Inventors: Ashford A. Galbreath, 6462 Red Oak Dr., Troy, MI (US) 48098; Asad S. Ali, 2168 Radcliffe Dr., Troy, MI (US) 48085; Mark A. Folkert, 36055 Crompton Cir., Farmington Hills, MI (US) 48335; Scott A. Ziolek, 8192 Lake Crest Dr., Ypsilanti, MI (US) 48197; Terry R. O'Bannon, 1825 Dallas Ave., Royal Oak, MI (US) 48067

( * ) Notice: Subject to any disclaimer, the term of this patent is extended or adjusted under 35 U.S.C. 154(b) by 0 days.

(21) Appl. No.: 11/458,832

(22) Filed: Jul. 20, 2006

(65) Prior Publication Data

US 2008/0018162 A1 Jan. 24, 2008

(51) Int. Cl.
*A47C 7/02* (2006.01)
(52) U.S. Cl. .............. 297/452.27; 297/452.37; 297/452.58; 297/DIG. 1; 297/DIG. 2
(58) Field of Classification Search ............ 297/452.58, 297/452.27, 452.37, DIG. 1, DIG. 2; 29/91.1
See application file for complete search history.

(56) References Cited

U.S. PATENT DOCUMENTS

| | | | | |
|---|---|---|---|---|
| 3,833,259 A | * | 9/1974 | Pershing | 297/452.27 |
| 4,744,601 A | * | 5/1988 | Nakanishi | 297/391 |
| 4,755,411 A | | 7/1988 | Wing et al. | |
| 4,852,228 A | * | 8/1989 | Zeilinger | 29/91.1 |
| 4,861,104 A | * | 8/1989 | Malak | 297/218.3 |
| 4,999,068 A | * | 3/1991 | Chiarella | 156/78 |
| 5,000,515 A | | 3/1991 | Deview | |
| 5,219,649 A | * | 6/1993 | Nishino et al. | 428/317.7 |
| 5,384,946 A | | 1/1995 | Sundstedt et al. | |
| 5,544,942 A | | 8/1996 | Vu Khac et al. | |
| 5,564,144 A | | 10/1996 | Weingartner et al. | |
| 5,603,874 A | * | 2/1997 | Ishii et al. | 264/46.5 |
| 5,669,799 A | | 9/1997 | Moseneder et al. | |
| 5,786,394 A | | 7/1998 | Slaven | |
| 6,089,657 A | | 7/2000 | Banno et al. | |
| 6,271,279 B1 | * | 8/2001 | Nodelman et al. | 521/159 |
| 6,652,034 B1 | | 11/2003 | Schramm et al. | |
| 6,733,072 B2 | | 5/2004 | Jaillet et al. | |
| 6,739,655 B1 | * | 5/2004 | Schwochert et al. | 297/195.12 |
| 7,144,081 B2 | * | 12/2006 | Baltzer | 297/216.12 |
| 2004/0084937 A1 | | 5/2004 | Berta | |
| 2004/0216236 A1 | | 11/2004 | Lievestro et al. | |
| 2005/0140199 A1 | | 6/2005 | Kang et al. | |
| 2005/0282921 A1 | * | 12/2005 | Flanigan et al. | 521/99 |
| 2006/0022505 A1 | | 2/2006 | Pyzik et al. | |

FOREIGN PATENT DOCUMENTS

| | | |
|---|---|---|
| DE | 691 11 471 T2 | 3/1996 |
| DE | 694 05 487 T2 | 4/1998 |
| DE | 197 51 091 A1 | 5/1999 |
| DE | 198 45 730 A1 | 7/1999 |
| DE | 101 52 768 A1 | 6/2002 |
| DE | 10 2004 062 311 A1 | 8/2005 |
| JP | 2005320431 A | 11/2005 |

* cited by examiner

*Primary Examiner*—Milton Nelson, Jr.
(74) *Attorney, Agent, or Firm*—Brooks Kushman P.C.

(57) ABSTRACT

The present invention relates to an environmentally friendly layered vehicle seat assembly and a method of making the same. In at least one embodiment, the vehicle seat assembly comprises a cushion composite comprising a structural layer and a cushion layer adjacent to the structural layer, and a trim material secured over the cushion composite.

23 Claims, 3 Drawing Sheets

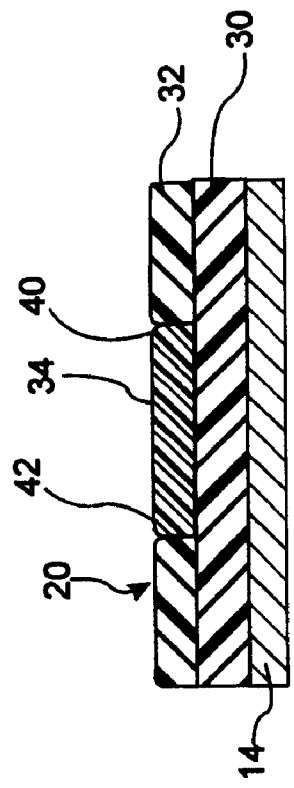
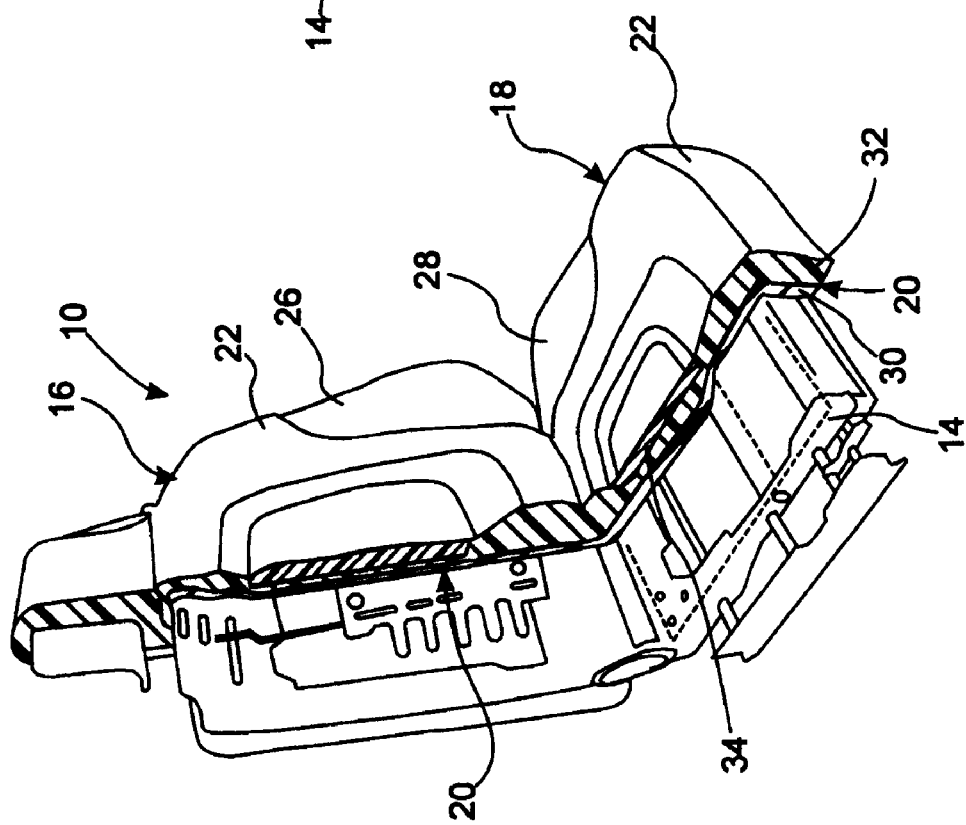

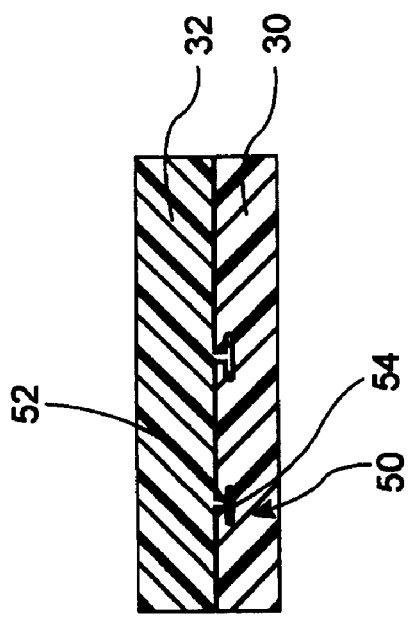
Figure 6
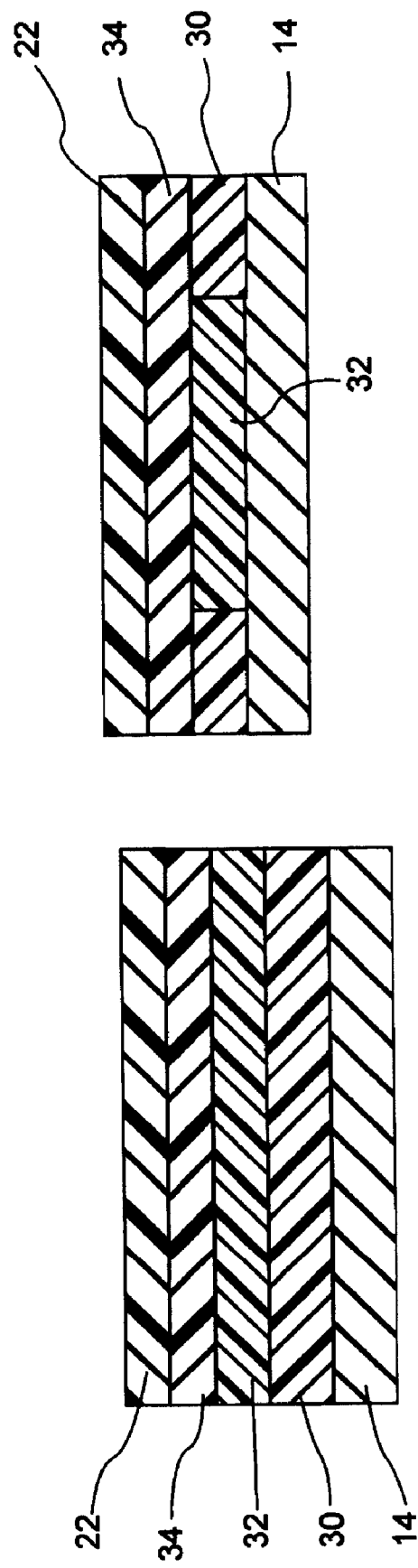
Figure 4
Figure 2

ENVIRONMENTALLY FRIENDLY LAYERED SEATING ASSEMBLY

BACKGROUND OF THE INVENTION

1. Field of the Invention

The present invention relates to an environmentally friendly layered vehicle seat assembly and a method of making the same.

2. Background Art

Generally speaking, most seat assemblies include three fundamental components: (a) a frame to support the seat assembly and mount it to a body, such as a vehicle; (b) a foam cushion to cover the frame; and (c) trim material to cover foam cushion and provide a durable surface for contact with a seat assembly occupant. Conventional vehicle seating designs typically involve mixing of base construction polymers joined in a manner that is difficult to disassemble and not focused on environmentally friendly material use.

Accordingly, there is a need to provide a vehicle seat assembly which is environmentally friendly yet structurally sound and comfortable.

SUMMARY OF THE INVENTION

According to at least one aspect of the present invention, a vehicle seat assembly is provided. In at least one embodiment, the vehicle seat assembly comprises a cushion composite comprising a structural layer and a cushion layer adjacent to the structural layer, and a trim material secured over the cushion composite.

In at least another embodiment, the vehicle seat assembly comprises a cushion composite comprising an EPP structural layer, a soy-based foam cushion layer adjacent to the structural layer, and a comfort pad adjacent the cushion layer, and a trim material secured over the cushion composite.

According to at least another aspect of the present invention, a method of making a vehicle seat assembly is provided. In at least one embodiment, the method comprises providing a cushion composite comprising a structural layer and a cushion layer adjacent to the structural layer, and securing a trim material over the cushion composite.

BRIEF DESCRIPTION OF THE DRAWINGS

FIG. 1 is a schematic cut-away environmental view of a vehicle seat assembly in accordance with an embodiment of the present invention;

FIG. 2 is a schematic sectional view of the vehicle seat assembly illustrated in FIG. 1, taken through line 2-2;

FIG. 3 is a view similar to FIG. 2 illustrating another embodiment of the present invention;

FIG. 4 is a view similar to FIG. 3 illustrating another embodiment of the present invention;

FIG. 6 is a schematic side sectional view showing an additional embodiment of the present invention.

DETAILED DESCRIPTION OF THE PREFERRED EMBODIMENTS

Figure 5:
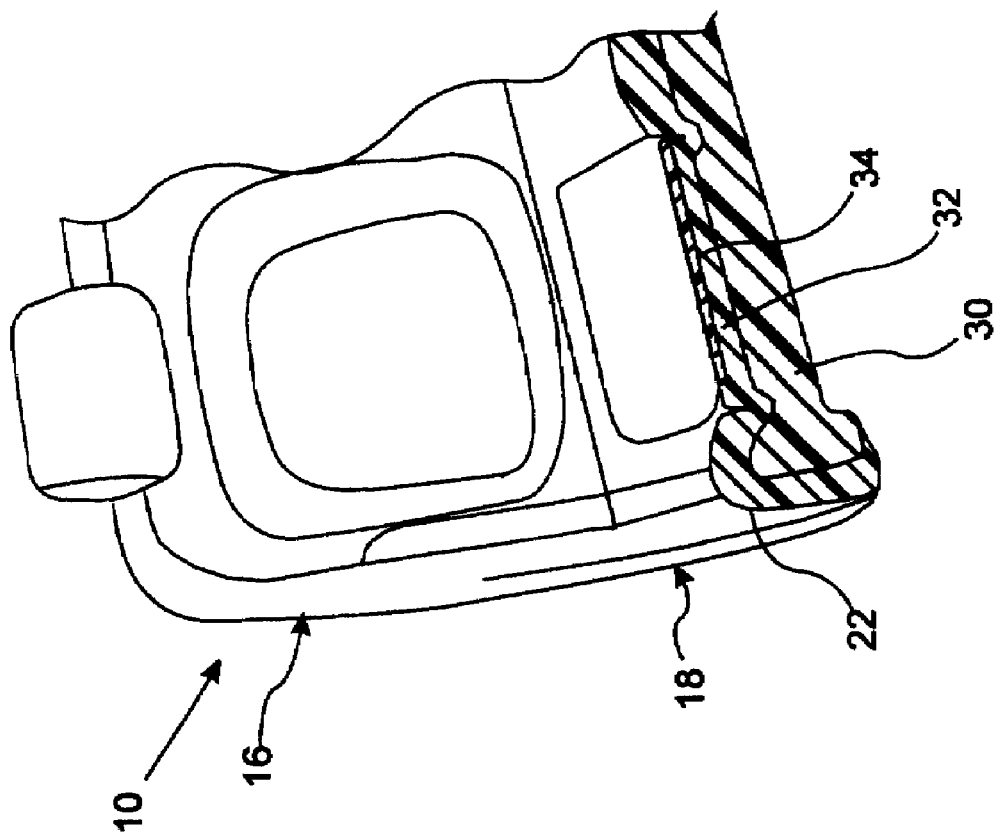
FIG. 5 is a view similar to FIG. 1 illustrating another embodiment of the present invention.

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in the description and in the claims are to be understood as modified by the word "about" in describing the broader scope of this invention. Practice within the numerical limits stated is generally preferred. Also, unless expressly stated to the contrary, the description of a group or class of material as suitable or preferred for a given purpose in connection with the invention implies that mixtures of any two or more members of the group or class may be equally suitable or preferred.

Referring now to the Figures, where like numerals are used to designate like structures throughout the drawings, a schematic vehicle seat assembly in accordance with at least one embodiment of the present invention is generally shown at 10 in FIG. 1. While the vehicle seat assembly 10 is illustrated in FIG. 1 to be a bucket seat assembly, it should be understood that the principles of the invention are applicable to other types of seat assemblies, such as bench, captain and other types of seat assemblies. It should also be understood that the principles of the present invention are applicable to other configurations where foam is a component such as backrests, back support pads, armrests, and head restraints. Still further, it should also be understood that the principles of this invention are applicable to all types of vehicle seat assemblies as well as non-vehicle seat assemblies.

As shown in FIG. 1, the vehicle seat assembly 10 includes a seat frame, generally indicated at 14 having a plurality of mounting brackets (not shown) adapted to operatively secure the seat frame within a vehicle. The seat frame 14 may be constructed from any material suitable for application within a vehicle seat assembly 10, such as aluminum, steel or other metal alloy, composite material, or a suitable polymer. Further, the seat frame 14 may be manufactured using techniques commonly known in the art, and relative to the type of material employed. By way of example, manufacturing techniques may include stamping, welding, fastening or molding a suitable material to form the seat frame 14.

The vehicle seat assembly 10 also includes a seat back, generally indicated at 16, and a lower seat assembly, generally indicated at 18. In at least the illustrated embodiment, the seat back 16 and the lower seat assembly 18 each have the same cushion composite 20 covered by a trim material 22. However, it should be understood that the cushion composite 20 for the seat back 16 can differ from the cushion composite 20 of the lower seat assembly 18. Likewise, it should be understood that the trim material 22 for the seat back 16 can differ from the trim material 22 for the lower seat assembly 18.

In at least one embodiment, and as shown in FIG. 1, the vehicle seat assembly 10 includes an upper and lower side shields 26 and 28, respectively. The seat shields 26 and 28 can be made of any suitable plastic material such as polypropylene, expanded polypropylene, filler reinforced plastic, or other types of plastic. It should be understood however that one or both of the side shields 26 and 28 could be omitted as desired. Likewise, as will be explained further below, it should be understood that the frame 14 could optionally be omitted as desired. As can best be seen in FIG. 1, the cushion composite 20 is received on or around the frame 14 and the trim material 22 is adapted to engage the cushion composite 20 and/or the frame in a covering relationship.

As can best be seen in FIGS. 1 and 2, the cushion composite 20 includes a structural layer 30, in at least the illustrated embodiment, disposed over frame 14, and a cushion layer 32 that is disposed over the structural layer 30. The cushion composite 20, as shown in the embodiment illustrated in FIGS. 1 and 2, optionally includes a comfort pad 34 that is disposed over the cushion layer 32. As will be explained further below, each of the layers 30, 32 and 34 cooperate with, and in some embodiments are secured to, each other in a manner such that they are relatively easily separable for recycling at end of use. If any of the layers 30, 32, and 34 are secured to another, suitable securement methods can be used, such as the use of interface fits, surface tension resistance modifications, clips and/or adhesive, in such a manner as to allow for relatively easy separation of the layers.

The structural layer 30 can be any suitable structural foam material. In at least one embodiment, suitable structural materials will have a rigidity and/or density that is higher than conventional polyurethane foam. In at least one embodiment, suitable structural foam materials have a density of at least 1.75 pounds per cubic foot (pcf), and less than 7.0 pcf. In at least another embodiment, suitable structural foam materials will have a density of 2.0 to 4.0 pcf, and in yet other embodiments of 2.5 to 3.5 pcf. Density of the structural foam material can be measured in accordance with ASTM test method No. D3574.

In at least one embodiment, suitable structural materials will have a hardness of 150 to 250 N (Newtons), in at least another embodiment of 175 to 230 N, and in at least another embodiment of 190 to 215 N. Hardness can be measured by ASTM test method No. D3574 and at 25% compression or deflection. In at least one embodiment, suitable structural materials will have a compression strength of 20 to 100 psi, in at least another embodiment of 30 to 80, and in at least another embodiment of 35 to 65, as measured in accordance with ASTM test method No. D3574.

In at least one embodiment, the structural layer 30 comprises a molded expanded polyolefin (EPO) layer. Suitable examples of expanded polyolefin (EPO) include, but are not necessarily limited to, expanded polyethylene (EPE), expanded polypropylene (EPP), expanded polybutylene (EPB), and copolymers of ethylene, propylene, butylene, 1,3-butadiene, and other olefin monomers, such as alpha-olefin monomers having from 5-18 carbon atoms, and/or cycloalkylene monomers such as cyclohexane, cyclopentene, cyclohexadiene, norbornene, and aromatic substituted olefins, such as styrene, alpha-methylstyrene, paramethylstyrene, and the like.

In at least one particular preferred embodiment, the EPO is expanded polypropylene (EPP) and its copolymers with ethylene, propylene and butylene. Any suitable EPP may be used, however in at least one embodiment, suitable EPP's include, but are not limited to, ARPRO® EPP available from JSP International and EPP available from SCA Packaging North America.

Expanded polyolefins can be prepared by a bead polymerization process in which relatively small uniform beads of polymer are produced, containing a gas which is later utilized to effect blowing during the molding process. The most commonly used gas is air although other gases including low boiling point liquids which produce gases at the molding temperatures may be used. Suitable gases include, but are not limited to, air, nitrogen, carbon dioxide, pentene and the like.

While the structural layer 30 can have any suitable size and configuration, in at least one embodiment, the structural layer 30 has an average thickness of 5 to 100 mm, in other embodiments of 20 to 70 mm, and in yet other embodiments of 30 to 50 mm.

The cushion layer 32 can comprise any suitable cushion material, such as a suitable resilient polymer. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3574. In at least one embodiment, suitable cushion materials will have a hardness of 175 N (Newtons) to 400 N, in other embodiments of 225 to 350 N, and in yet other embodiments of 275 to 325 N. Hardness of the cushion material can be measured by ASTM test method No. D3574. In at least one embodiment, suitable cushion materials will have a hysteresis of 18 to 30 KPa, in another embodiments of 20 to 28 KPa, and in yet other embodiments of 23-26 KPa. Hysteresis of the cushion material can be measured by ASTM test method No. D3574.

In at least certain embodiments, the cushion material comprises conventional polyurethane foam, soy-based foam, silicone, thermoplastic olefins, thermoplastic urethanes, and/or natural oil-based expanded polyurethanes and the like. In at least one embodiment, because of its environmentally friendly nature, soy-based polyurethane is preferred. Soy-based polyurethane can be made with any suitable soy-based polyols, such as those available, but not necessarily limited to, from Bayer, Urethane Soy Systems, and Dow Chemical. Any suitable soy-based polyurethane may be used, however in at least one embodiment, suitable soy-based polyurethanes include, but are not necessarily limited to those available from Woodbridge Foam and Renosol. The cushion layer 32 can be any suitable size and shape, however, in at least one embodiment, the cushion layer 32 has an average thickness of 20 to 100 mm, and in at least another embodiment of 30 to 70 mm, and in still yet other embodiments of 40 to 60 mm.

The comfort pad 34 can comprise any suitable comfort layer or pad and can be made of any suitable material that provides good hand feel and soft resilience as the seat assembly 10 is deflected during use. The comfort pad 34 is optionally provided when the cushion layer 32 has a density above 3.0 pcf, as measured according to ASTM test method No. D3574 and/or a hardness above 300 N, as measured according to ASTM test method No. D3574 at a compression of 25%. In at least one embodiment, the comfort pad 34 comprises a sheet of relatively soft material, such as a low hardness foam or a pad of non-woven fibrous materials. While the comfort pad 34 may have any suitable shape and size and configuration, in at least one embodiment, the comfort pad 34 has an average thickness of 2 to 30 mm, in other embodiments of 5 to 20 mm, and in yet other embodiments of 8 to 15 mm.

In at least one embodiment, the comfort pad 34 comprises a polyester or nylon non-woven fiber pad. In at least one embodiment, the comfort pad 34 comprises a non-woven compressed fiber material that is compatible, i.e., a similar type of polymer, with the trim material 22. In at least one embodiment, the comfort pad 34 of non-woven fibrous material comprises a thickness of 5-15 mm and a wt. of 2 to 6 oz.

In at least another embodiment, the comfort pad 34 comprises a sheet of foam having an average thickness of 8 to 20 mm. In at least one embodiment, the foam comfort pad 34 has a density of 1.8 to 2.5 pcf, as measured according to ASTM test method No. D3574. In at least one embodiment, the foam comfort pad 34 has a hardness of 5 to 12 N, as measured according to ASTM test method No. D3574 at a compression or deflection of 25%. In at least certain embodiments, the foam comfort pad 34 can have an air permeability of above 2.0 cubit feet/minute and/or a compression set (75%) of no more than 20%.

It should be understood that the structural layer 30, the cushion layer 32, and the comfort pad 34 can have any suitable configuration, shape and size. For instance, as shown in FIG. 2, each layer 30, 32 and 34 have similar sizes and constructions with the structural layer 30 being disposed over the frame 14, the cushion layer 32 being disposed over the structural layer, and the comfort pad 34 being disposed over the cushion layer.

As can be seen in FIG. 3, the cushion layer 32 has an inner surface 40 defining a cavity 42 within which the comfort pad 34 is received. Referring to FIG. 3, another embodiment is illustrated. In other words, the structural layer 30 can comprise a generally uniform layer of material disposed on the frame 14 with the cushion layer 32 comprising a hollow layer having a cavity 42 within which the comfort pad 34 is received.

Referring to FIG. 4, an alternative configuration is shown wherein the structural layer 30 is configured to have a cavity within which the cushion layer 32 is received. As shown in FIG. 4, the comfort pad 34 can extend over both the structural layer 30 and the cushion layer 32 or in another embodiment (not shown) the comfort pad 34 can extend only over the cushion layer 32 or the structural layer 30. As can be envisioned, may different configurations of the layers 30-34 can be encompassed by the present invention, even those which are not shown or described herein.

As discussed, the vehicle seat assembly 10 also includes trim material 22 which is adapted to engage the cushion composite 20 in a covering relationship. The trim material 22 may include any material known in the art. By way of example, some of the known materials include cloth, leather or polymers of sufficient quality and thickness for use in seat trim applications. Polymer trim materials may include a flexible close cell polymer skin material such as polyvinyl, polyvinyl chloride (PVC), polyester, nylon, thermoplastic olefin (TPO) or thermoplastic urethane (TPU). Additional materials for use as trim material 22, may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass, nylon, polyester or natural fibers may be applied to the foam backing or back of the trim material 22 for increase in strength without increasing rigidity. In at least one particularly preferred embodiment, the trim material 22 comprises polyester or nylon trim material having polyester or nylon trim fasteners (not shown) for securing the trim material 22 to one or more components (i.e., cushion 20 and/or frame 14) of the vehicle seat assembly 10.

In at least certain embodiments, the layers 30-34 of the cushion composite 20 are configured so that they can be easily assembled and disassembled to facilitate assembly and end of line disassembly for recycling. In at least one embodiment, the layers 30-34 are not secured to each other by any suitable mechanical fastening. In this embodiment, the layers 30-34 are either placed over each other and/or within recesses of an adjustment layer and held together by the overlying trim material 22. In other embodiments, such as schematically illustrated in FIG. 6, the one or more layers 30-34 can have a mechanical fastening component schematically illustrated at 50 in FIG. 6. In at least one embodiment, the mechanical fastening component 50 can comprise a male protrusion 52 that is receivable within a female recess 54 in an adjacent layer.

In at least other embodiments, the mechanical fastening component 50 could comprise an adhesive layer. In keeping with the environmentally friendly considerations of the vehicle seat assembly 10, any adhesive layer that is used should be compatible with one or more of the adjacent layers for ease of recycling. For example, a polyester-based adhesive can be used to adhere polyester trim 22 to a non-woven polyester comfort layer 34 thereby maintaining common polymer content in that layer. Similarly if attachment clips are used in the polyurethane layer, they could be molded out of thermoplastic polyurethane (TPU) to again preserve commonality of polymer content in the layer. When separated, the TPU clips could remain in the support polyurethane layer.

As discussed above, the vehicle seat assembly 10 of the present invention is readily recyclable. In this regard, the layers 30-34 can be easily separated from each other and from the trim material 22 in a relatively easy and straightforward fashion. For instance, the layers 30-34 can be separately recycled without any difficulty and recycled in separate streams.

Referring to FIG. 5, an alternative embodiment of the seat assembly 10 is illustrated. In this embodiment, seat frame 14 illustrated in FIGS. 1-4 is omitted. Such a configuration is typically more practical in second and third row seats.

While embodiments to the invention has been illustrated and described, it is not intended that these embodiments illustrate and describe all possible forms of the invention. Moreover, the words used in the specification are words of description rather than limitation, and it is understood that various changes may be made without departing from the spirit and scope of the invention.

What is claimed is:

1. A vehicle seat assembly comprising:
   a cushion composite comprising a structural molded expanded polyolefin layer and a foam cushion layer having a surface and hysteresis of 18 to 30 KPa, the foam cushion layer being substantially adjacent to the structural layer and in substantially uninterrupted contact with the structural layer; and
   a trim material secured over the cushion composite, wherein the cushion composite further comprises a comfort pad disposed between the structural layer and the trim material, wherein the structural layer, the cushion layer, the comfort pad and the trim material are not secured to each other such that they are separable from each other.

2. The vehicle seat assembly of claim 1 wherein the cushion layer has a density of 1.5 to 4.5 pcf and wherein the density of the cushion layer is less than a density of the structural layer.

3. The vehicle seat assembly of claim 1 wherein the comfort pad is disposed between the cushion layer and the trim material.

4. The vehicle seat assembly of claim 1 wherein the structural layer comprises a structural foam having compressive strength of 20-100 psi.

5. The vehicle seat assembly of claim 1 wherein the cushion layer is made of polyurethane and includes molded polyurethane attachment clips.

6. The vehicle seat assembly of claim 1 wherein the cushion layer comprises soy-based polyurethane.

7. The vehicle seat assembly of claim 1 further comprising a frame, wherein the structural layer is disposed between the frame and the cushion layer.

8. The vehicle seat assembly of claim 1 wherein the structural layer has a density of 1.75 to 7.0 pcf, a hardness of 150 to 250 N, and a compression strength of 20 to 100 psi and wherein the cushion layer has a density of 1.5 to 4.5 pcf.

9. The vehicle seat assembly of claim 1 wherein the cushion layer is made of polyurethane and the comfort pad is in direct contact with the trim material and the cushion layer.

10. The vehicle seat assembly of claim 9 wherein the foam cushion layer is disposed over the structural layer and the foam cushion layer is disposed over a seat frame.

11. The vehicle seat assembly of claim 9 wherein the expanded polyolefin comprises expanded polypropylene.

12. The vehicle seat assembly of claim 11 wherein the structural layer has a density of 1.75 to 7.0 pcf 13. The vehicle seat assembly of claim 12 wherein the structural layer has a hardness of 150 to 250 N, and a compression strength of 20 to 100 psi.

14. The vehicle seat assembly of claim 11 wherein the structural layer has an average thickness of 5 to 100 mm, the cushion layer has an average thickness of 20 to 100 mm, and the comfort pad has an average thickness of 2 to 30 mm.

15. The vehicle seat assembly of claim 14 wherein the comfort pad is made of non-woven compressed fibrous material.

16. The vehicle seat assembly of claim 15 wherein the trim material is made of polymeric material.

17. A vehicle seat assembly comprising:
a cushion composite comprising a structural molded expanded polyolefin layer and a foam cushion layer having a surface and hysteresis of 18 to 30 KPa, the foam cushion layer being substantially adjacent to the structural layer and in substantially uninterrupted contact with the structural layer, wherein the cushion layer is made of polyurethane and includes molded polyurethane attachment clips; and
a trim material secured over the cushion composite.

18. The vehicle seat assembly of claim 17 wherein the structural layer, the cushion layer, a comfort pad and the trim material are not secured to each other such that they are separable from each other.

19. A vehicle seat assembly comprising:
a cushion composite comprising an EPP structural layer having a density of 1.75 to 7.0 pcf, a soy-based foam cushion layer adjacent to the structural layer and having a density of above 3.0 pcf, and a comfort pad adjacent the cushion layer, the structural layer having an average thickness of 5 to 100 mm, the cushion layer having an average thickness of 20 to 100 mm and the comfort pad having an average thickness of 2 to 30 mm; and
a trim material secured over the cushion composite.

20. A vehicle seat assembly comprising:
a cushion composite comprising a structural molded expanded polyolefin layer and a foam cushion layer having a surface and hysteresis of 18 to 30 KPa, the foam cushion layer being substantially adjacent to the structural layer and in substantially uninterrupted contact with the structural layer, wherein the structural layer has a density of 1.75 to 7.0 pcf, a hardness of 150 to 250 N, and a compression strength of 20 to 100 psi and wherein the cushion layer has a density of 1.5 to 4.5 pcf; and
a trim material secured over the cushion composite.

21. The vehicle seat assembly of claim 20 wherein the structural layer, the cushion layer, a comfort layer and the trim material are not secured to each other such that they are separable from each other.

22. A vehicle seat assembly comprising:
a cushion composite comprising a structural molded expanded polypropylene layer having a density of 1.75 to 7.0 pcf and a foam cushion layer made of polyurethane and having a surface and hysteresis of 18 to 30 KPa, the foam cushion layer being substantially adjacent to the structural layer and in substantially uninterrupted contact with the structural layer; and
a trim material secured over the cushion composite, wherein the cushion composite further comprises a comfort pad disposed in direct contact with and between the structural layer and the trim material.

23. A vehicle seat assembly comprising:
a cushion composite comprising a structural molded expanded polyolefin layer and a foam cushion layer having a surface and hysteresis of 18 to 30 KPa, the foam cushion layer being substantially adjacent to the structural layer and in substantially uninterrupted contact with the structural layer; and
a trim material secured over the cushion composite, wherein the cushion composite further comprises a comfort pad disposed between the structural layer and the trim material, wherein the cushion layer is made of polyurethane and includes molded polyurethane attachment clips.

* * * * *